United States Patent Office 2,928,867
Patented Mar. 15, 1960

2,928,867

PREPARATION OF STABLE ALKARYL SULFONATES

James C. Kirk, Lake Charles, La., and Edsel L. Miller, Houston, Tex., assignors to Continental Oil Company, Ponca City, Okla., a corporation of Delaware No Drawing. Application January 5, 1955
Serial No. 480,068

13 Claims. (Cl. 260—505)

The present invention relates to alkylated aryl sulfonates and relates more particularly to the production of stable alkylated aryl sulfonates prepared by the neutralization of alkaryl sulfonic acids which in turn were prepared by reacting an alkaryl hydrocarbon with sulfur trioxide.

The steadily increasing production of sulfonated detergents during recent years has focused interest upon improved procedures for their sulfonation. In one method sulfonation of an alkaryl hydrocarbon has followed the procedure wherein about 1.3 to about 2 parts by weight of 100 to 105 percent sulfuric acid is used per part by weight of the alkaryl hydrocarbon. Upon completion of the sulfonation reaction the reaction mixture is neutralized with sodium hydroxide or other base producing a mixture comprising sodium alkaryl sulfonate, sodium sulfate, and unsulfonated oil. The sodium sulfate content of the mixture varies from about 45 to about 85 percent depending upon (1) the amount of water used in the "water kill" step following sulfonation, (2) the molecular weight of the alkaryl hydrocarbon, (3) the quantity and concentration of the sulfuric acid, and (4) the percent conversion of the alkaryl hydrocarbon. Obviously the elimination of sodium sulfate is desirable because its presence reduces the active ingredient content of the mixture and reduces the solubility of the active ingredient in water. Various methods have been suggested for removing the sodium sulfate but such methods have not been entirely satisfactory because they involved an undesirable expenditure of materials and time. Another method proposed for preparing alkaryl sulfonates substantially free of sodium sulfate is by using sulfur trioxide as the sulfonating agent. While this process has many advantages over processes using sulfuric acid or oleum, this particular process has disadvantages that are quite serious. One such disadvantage is that the sulfonates prepared by neutralizing such alkaryl sulfonic acids with an aqueous alkali solution become acid after storage for short periods of time. This phenomena known as "acid drift" or "pH reversion" as it is called in the art, has in the past believed to be inherent in the sulfur trioxide procedure although considerable variation was noted, depending upon the type of process and the conditions used. In the past this pH reversion has been overcome by using up to 10% alkali in excess of that required for neutralization of the sulfonic acid. Another disadvantage is that neutralized sulfonic acids prepared by the reaction of sulfur trioxide and alkaryl hydrocarbons give cloudy solutions in water and in general are less soluble than the corresponding product prepared using sulfuric acid or oleum as the sulfonating agent.

It is, therefore, a principal object of this invention to provide an improved process by which sulfur trioxide-treated alkaryl hydrocarbons may be neutralized which obviates the disadvantages of the prior art processes. Another object of the present invention is to provide an improved process for the production of stable alkaryl sulfonates prepared by sulfonating an alkaryl hydrocarbon with sulfur trioxide. Further objects and advantages of the invention will be apparent to those skilled in the art from the accompanying disclosure and discussion.

The foregoing objects are attained by a process which involves in brief the following steps:

An alkaryl hydrocarbon is sulfonated with sulfur trioxide under sulfonating conditions. Following sulfonation a small amount of water is added to the resulting alkaryl sulfonic acid, after which the sulfonic acid is neutralized, producing a stable alkaryl sulfonate.

While we do not wish to be bound by any theory of how our results are produced, we believe that the correct explanation of these results is substantially as follows: The cloudiness and insolubility of salts of organic sulfonates are due in part to the presence of insoluble neutral compounds that are formed by the reaction of sulfur trioxide with alkaryl hydrocarbons. These neutral compounds are sulfones, sulfonic anhydrides and similar compounds which may be formed by reaction such as, for example,

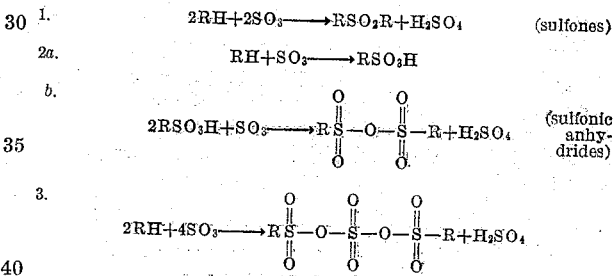

wherein R is alkaryl.

In addition to the sulfuric acid formed in the foregoing reactions as a byproduct to the sulfone, anhydride or similar products a higher order sulfuric acid is also formed such as $H_2S_2O_7$, $H_2S_3O_{10}$, $H_2S_4O_{13}$, etc. In addition to their insolubility these compounds hydrolyze very slowly in neutral, slightly acid, or basic solutions. The sulfonic acid is added to the alkaline solution in the usual neutralization procedure and as a result the mixture is always alkaline, a condition unfavorable to rapid hydrolysis, consequently the pH of the mixture drifts to the acid side as these compounds slowly hydrolyze to acids. The addition of the alkaline solution to the acid is impracticable because of the excessive foaming which occurs when that procedure is followed. After the reaction between sulfur trioxide and the alkaryl hydrocarbon there is present in the reaction mixture in addition to the alkaryl sulfonic acid, sulfones, anhydrides as explained above, unreacted sulfur trioxide or its polymers. When water is added to this reaction mixture the unreacted sulfur trioxide is hydrated and in the very strongly acid medium formed the sulfones and anhydrides are soluble and are hydrolyzed rapidly to acids that will form soluble salts upon neutralization. This is in agreement with the statement made by Mitscherlich, Ann. 12, 309–310 (1834)

who stated, "diphenyl sulfone is insoluble in alkali, soluble in acids and on heating with sulfuric acid forms an acid which gives water soluble salts."

Suitable alkaryl hydrocarbons that may be used include those formed by alkylating benzene, toluene, xylenes, cumene, naphthalene, alkylnaphthalene, diphenyl, alkydiphenyl, and their halogen derivatives such as chlorobenzene, chlorotoluene and chloronaphthalene. The alkylation may be made under the influence of a catalyst with alkylating agents from about 3 to more than 20 carbon atoms as for example haloparaffins, olefins as from dehydrohalogenated haloparaffins, polyolefins such as for example polymers from ethylene, propylene, butylene, ethylene and propylene, alkylsulfates, aliphatic alcohols and others. The catalyst may be sulfuric acid, hydrofluoric acid, phosphorous containing catalysts, aluminum chloride, boron fluoride alone or with activators such as hydrogen fluoride or hydrogen chloride. Other hydrocarbons that may be used are raw petroleum distillate or fractions either subjected to selective solvent action or not. Preferred organic hydrocarbons are benzene or toluene reacted with tri-, tetra, or penta-propylene fractions obtained by the polymerization of propylene, as for example dodecylbenzene which is obtainable under the trade name of Neolene 400. Physical properties of Neolene 400 are as follows:

| | | |
|---|---|---|
| Specific gravity at 16° C. | | 0.8742 |
| Average molecular weight | | 232 |
| A.S.T.M. (.D-158 Engler): | | |
| I.B.P. | ° F | 535 |
| 5 | ° F | 545 |
| 10 | ° F | 550 |
| 50 | ° F | 560 |
| 90 | ° F | 580 |
| 97 | ° F | 592 |
| F.B.P. | ° F | 603 |
| Refractive index at 20° C. | | 1.4885 |
| Viscosity at 20° C. | | 14 |
| Bromine number | | 0.16 |

Another suitable alkaryl hydrocarbon is the compound called postdodecylbenzene which is a mixture of monoalkylbenzenes and dialkylbenzenes in the approximate ratio of 2:3. Its typical physical properties are as follows:

| | | |
|---|---|---|
| Specific gravity at 38° C. | | 0.8649 |
| Average molecular weight | | 365 |
| Percent sulfonatable | | 88 |
| A.S.T.M. (.D-158 Engler): | | |
| I.B.P. | ° F | 647 |
| 5 | ° F | 682 |
| 50 | ° F | 715 |
| 90 | ° F | 760 |
| 95 | ° F | 775 |
| F.B.P. | ° F | 779 |
| Refractive index at 23° C. | | 1.4900 |
| Viscosity at: | | |
| −10° C. | centipoises | 2800 |
| 20° C. | do | 280 |
| 40° C. | do | 78 |
| 80° C. | do | 18 |
| Aniline point | ° C | 69 |
| Pour point | ° F | −25 |

Sulfonation may be accomplished using either sulfur trioxide or a stabilized liquid sulfur trioxide having more than 99 percent available $SO_3$ content as is available commercially under the trade name "Sulfan." Unrefined sulfur trioxide as obtained from the catalytic oxidation of sulfur dioxide may also be used. The sulfur trioxide may be used undiluted in liquid or gaseous form but it is preferable to use an inert gas as a diluent. Thus, sulfur trioxide diluted with air, nitrogen, sulfur dioxide or methane may be used. Concentrations of from about 5% to 100% by weight sulfur trioxide in the diluent are operable but we prefer a concentration of less than 10%. Temperatures during the reaction may be maintained at from about 30 to 100° C. We prefer a temperature of 50–60° C. since below 50° the viscosity of the reacting mixture increases with lowering temperature. With increasing viscosity local over-heating takes place with subsequent charring because of increased mixing difficulties. As the reacting temperature is raised above about 60°, there is increasing charring and resulting darkening of product.

For some sulfonations it is advantageous to use a diluent for the material being sulfonated. Examples of such diluents are pentane, hexane, benzene, mineral oils and dioxane.

We have found that the addition of water to the sulfonic acid immediately after sulfonation results in very rapid and quantitative removal of the anhydrides. The actual amount of water used is critical. In theory the water requirement is approximately stoichiometric at a 1 to 1 molar ratio and on a weight basis the required amount of water is small since for example 1 gram of water is theoretically equivalent to 24.2 grams of dodecylbenzene sulfonic anhydride. In practice we use an excess of water. Suitable quantities of water vary from about 0.5 to 20 parts per 100 parts of the sulfonic acid. For best results we prefer to employ a somewhat narrower range of water; namely, 1 to 5 parts per 100 parts of sulfonic acid. The viscosity of the mixture increases when more than 10 parts of water is used and if the amount of water exceeds 20 parts the viscosity increases rapidly resulting in the formation of a gel. Under the latter condition the rate of hydrolysis is extremely slow. The temperature at which the water treatment is conducted is not critical as any temperature below 100° C. may be used. Preferred temperatures vary from about 30 to 60° C.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

*Example 1*

A reactor equipped with an efficient agitator and means for introducing a gas was charged with 400 parts of dodecylbenzene, Neolene 400. While agitating vigorously and maintaining the temperature at 50 to 60° C., 148 parts of sulfur trioxide diluted with 905 parts of air at 50° C. was passed in during 50 minutes. The resulting material was cooled to 30° C. and 10 parts of water added during about 5 minutes. The temperature rose to about 45° C. and the mixture was stirred for an additional 5 minutes. The resulting clear fluid solution was added to aqueous 14% sodium hydroxide solution and the pH adjusted to 8. A creamy white slurry was obtained which analyzed

| | |
|---|---|
| Water | 44 |
| Active sodium sulfonate | 53 |
| Sodium sulfate | 1.8 |
| Free oil | 1.25 |
| Total | 100.05 |

The slurry dissolved forming clear solutions in concentrations up to 25% at room temperature. After 24 hours and again after two weeks the pH was determined and observed to be 8, indicating that no pH reversion had taken place.

*Example 2*

Example 1 was repeated with the exception that various amounts of water from about 0.5 to about 20 parts were used in place of the 10 parts. Results similar to those of Example 1 were obtained.

Example 3

Example 1 was repeated with the exception that 400 parts of ice was added in place of the 10 parts of water. The resulting solution was very viscous and difficult to handle. It was neutralized to a pH of 8. The resulting slurry had a concentration of about 50% active sodium sulfonate. After standing 24 hours the slurry had a pH of less than 7. Dilution of the slurry with water to concentrations of about 0.5% active sulfonate gave opaque solutions.

Example 4

Example 1 was repeated with the exception that the sulfonation mixture (no water treatment) was neutralized by addition to an aqueous 14% sodium hydroxide solution. The resulting slurry had a concentration of about 53% active sodium sulfonate and a pH of 8. Dilution of the slurry with water to a concentration of about 0.2% active sulfonate gave cloudy solutions. Solutions of higher concentrations of active sulfonate were increasingly more cloudy. After 24 hours the pH was observed to be less than 7. By addition of an aqueous 15% sodium hydroxide solution the pH was adjusted again to 8. After another 24 hours the pH again was observed to be less than 7.

Example 5

Sodium dodecylbenzene sulfonate was prepared continuously using two reaction vessels or sulfonators suitably designed to contain the liquid reactants and products. An elongated vessel meeting this requirement is a modification of a commercially available piece of equipment known to the trade as a Votator and is described in U.S. Patents Nos. 2,063,065, and 2,063,066, issued December 8, 1936. The modification of these Votators is as described in the co-pending application of Horace E. Luntz and Daniel O. Popovac, Serial No. 396,822, filed December 8, 1953, now Patent No. 2,768,199 and assigned to the present assignee. Each Votator has 0.7 sq. ft. of heat exchanger surface, two scraper blades, and 9 jets for sulfur trioxide or water injection before each scraper blade. The Votator shaft was operated at 400 r.p.m. Twenty-nine pounds per hour of dodecylbenzene was charged into one Votator and 10 pounds per hour of sulfur trioxide (101.5 percent theory) was vaporized in a vaporizer at 106° F. with a dry air stream of 0.7 cu. ft. per minute. The vapor from the vaporizer was diluted with 8.0 cu. ft. per minute of dry air and introduced into the same votator. Contact time was approximately ¼ sec. Exit temperature was 171° F. The products from the Votator were charged to a separator where gases were separated continuously. The degassed sulfonic acids were then continuously charged into the second Votator to which 0.7 pound per hour of water was added continuously. On neutralization of the resulting sulfonic acid with aqueous sodium hydroxide solution there was obtained a sodium dodecylbenzene sulfonate slurry that analyzed on a dry basis: 1.18 percent sodium sulfate, 2.02 percent free oil (2.10 percent on actives), and 96.1 percent actives. On dilution with water a bright clear almost colorless solution was obtained.

Example 6

Sodium postdodecylbenzene sulfonate was prepared continuously using the equipment and method of Example 5. Forty pounds per hour of postdodecylbenzene was charged into one votator and 8.75 pounds per hour of sulfur trioxide was vaporized in a vaporizer at 106° F. with a dry air stream of 0.7 cu. ft. per minute. The vapor from the vaporizer was diluted with an additional quantity of air to give an air-SO$_3$ volume ratio of 17.9:1 and introduced into the same votator. Contact time was approximately ¼ sec. Exit temperature was 170° F. The products from the votator were charged to a separator where gases were separated continuously. The degassed sulfonic acids were then continuously charged into the second Votator to which 0.7 pound per hour of water was added continuously. On neutralization of the resulting sulfonic acid with aqueous sodium hydroxide solution there was obtained a sodium postdodecylbenzene sulfonate slurry that contained 53 percent active sodium sulfonate and 1.8 percent sodium sulfate and which exhibited no pH reversion upon standing.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of producing a stable alkaryl sulfonate which comprises reacting an alkaryl hydrocarbon with sulfur trioxide under sulfonating conditions, adding water to the resulting alkaryl sulfonic acid at a temperature below about 100° C. wherein the amount of added water varies from 0.5 to 20 parts per 100 parts of said sulfonic acid, neutralizing said sulfonic acid, and then recovering the alkaryl sulfonate.

2. A method of producing a stable alkaryl sulfonate which comprises reacting an alkaryl hydrocarbon with sulfur trioxide under sulfonating conditions, adding water to the resulting alkaryl sulfonic acid at a temperature within the range of about 30 to 60° C. wherein the amount of added water varies from 0.5 to 20 parts per 100 parts of said sulfonic acid, neutralizing said sulfonic acid, and then recovering the alkaryl sulfonate.

3. A method of producing a stable alkaryl sulfonate which comprises reacting an alkaryl hydrocarbon with sulfur trioxide under sulfonating conditions, adding water to the resulting alkaryl sulfonic acid at a temperature below about 100° C. wherein the amount of added water varies from 1 to 5 parts per 100 parts of said sulfonic acid, neutralizing said sulfonic acid, and then recovering the alkaryl sulfonate.

4. A method of producing a stable alkaryl sulfonate which comprises reacting an alkaryl hydrocarbon with sulfur trioxide under sulfonating conditions, adding water to the resulting alkaryl sulfonic acid at a temperature within the range of about 30 to 60° C. wherein the amount of added water varies from 1 to 5 parts per 100 parts of said sulfonic acid, neutralizing said sulfonic acid, and then recovering the alkaryl sulfonate.

5. The method of claim 1 wherein the alkaryl hydrocarbon is dodecylbenzene.

6. The method of claim 2 wherein the alkaryl hydrocarbon is dodecylbenzene.

7. The method of claim 3 wherein the alkaryl hydrocarbon is dodecylbenzene.

8. The method of claim 4 wherein the alkaryl hydrocarbon is dodecylbenzene.

9. The method of claim 1 wherein the alkaryl hydrocarbon is a mixture of monoalkylbenzenes and dialkylbenzenes in the approximate ratio of 2:3, said mixture boiling principally in the range of about 647° F. to 779° F.

10. The method of claim 2 wherein the alkaryl hydrocarbon is a mixture of monoalkylbenzenes and dialkylbenzenes in the approximate ratio of 2:3, said mixture boiling principally in the range of about 647° F. to 779° F.

11. The method of claim 3 wherein the alkaryl hydrocarbon is a mixture of monoalkylbenzenes and dialkylbenzenes in the approximate ratio of 2:3, said mixture boiling principally in the range of about 647° F. to 779° F.

12. The method of claim 4 wherein the alkaryl hydrocarbon is a mixture of monoalkylbenzenes and dialkylbenzenes in the approximate ratio of 2:3, said mixture boiling principally in the range of about 647° F. to 779° F.

13. A process for hydrolyzing dodecylbenzene sulfonic acid anhydrides existing in minor amounts in admixture with dodecylbenzene sulfonic acids, which comprises incorporating therewith an amount of water at least equivalent to the amount theoretically required to convert the anhydrides present to the corresponding acids but insufficient to cause substantial dilution of the sulfonic acids.

References Cited in the file of this patent

UNITED STATES PATENTS

| | | |
|---|---|---|
| 2,227,999 | Brandt et al. | Jan. 7, 1941 |
| 2,739,124 | Otto et al. | Mar. 20, 1956 |

OTHER REFERENCES

Mellor's Modern Inorganic Chemistry, Parkes, p. 463 (1952).

Gerhart et al.: "Jour. Am. Oil. Chem. Soc.," vol. 31, pp. 200–203 (1954).

Disclaimer

2,928,867.—*James C. Kirk*, Lake Charles, La., and *Edsel L. Miller*, Houston, Tex. PREPARATION OF STABLE ALKARYL SULFONATES. Patent dated Mar. 15, 1960. Disclaimer filed Jan. 26, 1973, by the assignee, *Continental Oil Company*.

Hereby disclaims the remaining term of said patent.

[*Official Gazette September 4, 1973.*]